United States Patent [19]

Jouaillec

[11] 4,346,614
[45] Aug. 31, 1982

[54] PROCESS AND DEVICE FOR INSTALLING A VERTICAL GYROSCOPE

[75] Inventor: Joseph Jouaillec, Versailles, France

[73] Assignee: Societe Nationale Industrielle Aerospatiale, Paris, France

[21] Appl. No.: 179,994

[22] Filed: Aug. 21, 1980

[30] Foreign Application Priority Data

Sep. 3, 1979 [FR] France ............................... 79 22006

[51] Int. Cl.³ ..................... G01C 19/26; G01C 19/30
[52] U.S. Cl. ..................................... 74/5.12; 74/5.42; 74/5.44; 74/5.7; 74/5.8
[58] Field of Search ..................... 74/5.1, 5.12, 5.14, 74/5.44, 5.42, 5.41, 5.7, 5.8

[56] References Cited

U.S. PATENT DOCUMENTS

| | | | |
|---|---|---|---|
| 2,605,641 | 8/1952 | Barkalow | 74/5.7 X |
| 2,654,254 | 10/1953 | Wendt | 74/5.1 |
| 2,729,978 | 1/1956 | Judson | 74/5.1 |
| 2,737,052 | 3/1956 | Noxon | 74/5.1 |
| 2,880,618 | 4/1959 | Jessup | 74/5.41 X |
| 2,891,407 | 6/1959 | Glenny | 74/5.1 |
| 2,907,212 | 10/1959 | Garnier | 74/5.1 |
| 3,359,807 | 12/1967 | Foulds et al. | 74/5.41 |

FOREIGN PATENT DOCUMENTS 1078486 5/1954 France .
761521 11/1956 United Kingdom .................. 74/5.1

Primary Examiner—Rodney H. Bonck
Attorney, Agent, or Firm—Merriam, Marshall & Bicknell

[57] ABSTRACT

The present invention relates to a process for setting up a vertical gyroscopic device mounted on a moving craft, wherein the action of roll reset means is eliminated only with a delay time with respect to the rotation of the mass, this delay time being such that upon its expiration the kinetic moment of the mass in rotation is sufficient to ensure the stability thereof and the erector system is controlled in the sense of activation only with another time delay necessary to reduce the movement of precession of the device. The invention is applicable to the guiding or control of missiles or aircraft.

2 Claims, 6 Drawing Figures

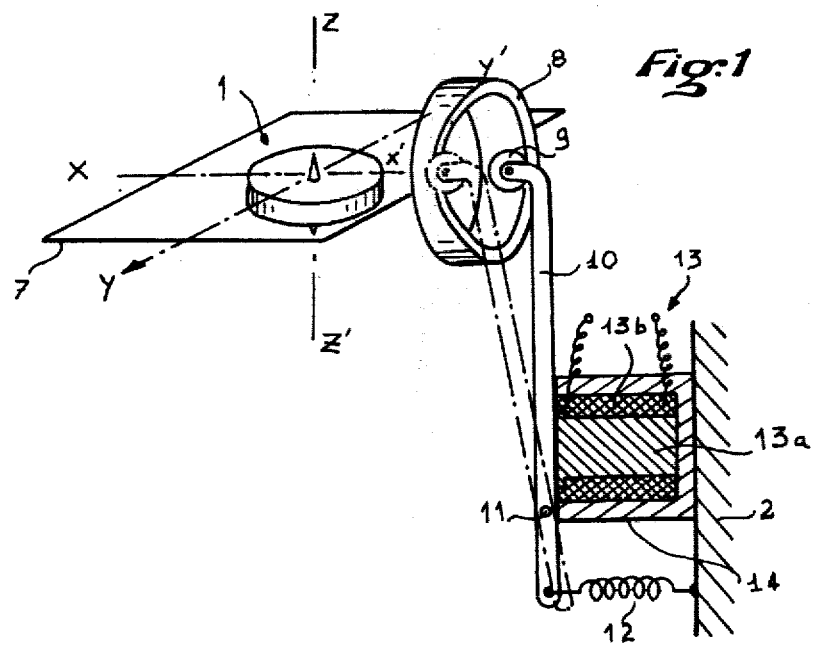
Fig:1
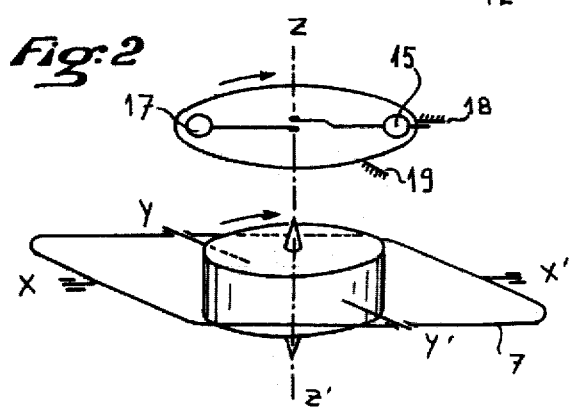
Fig:2
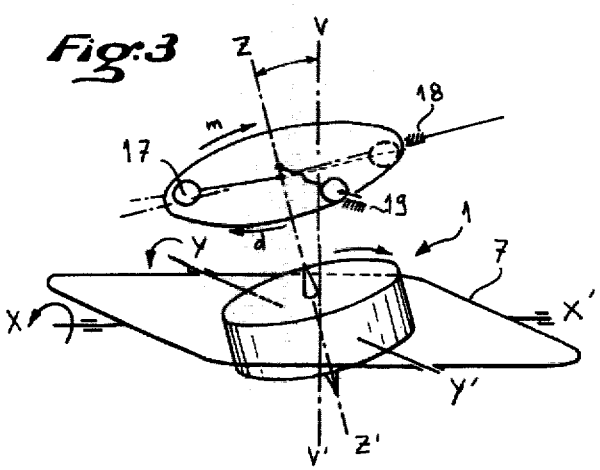
Fig:3

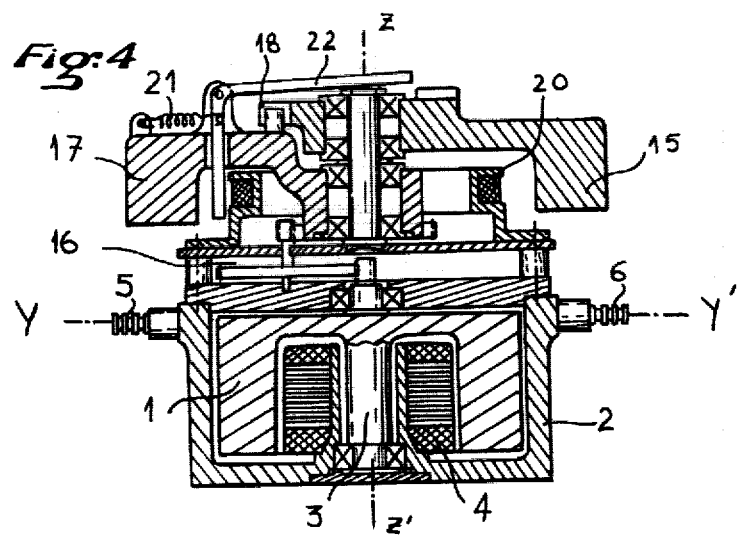
Fig: 4
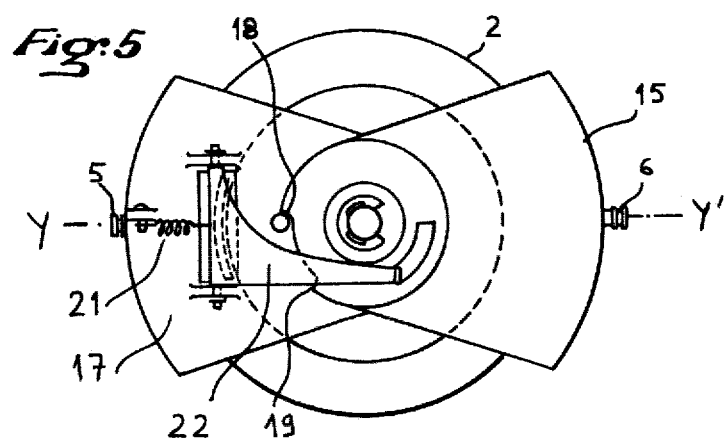
Fig: 5
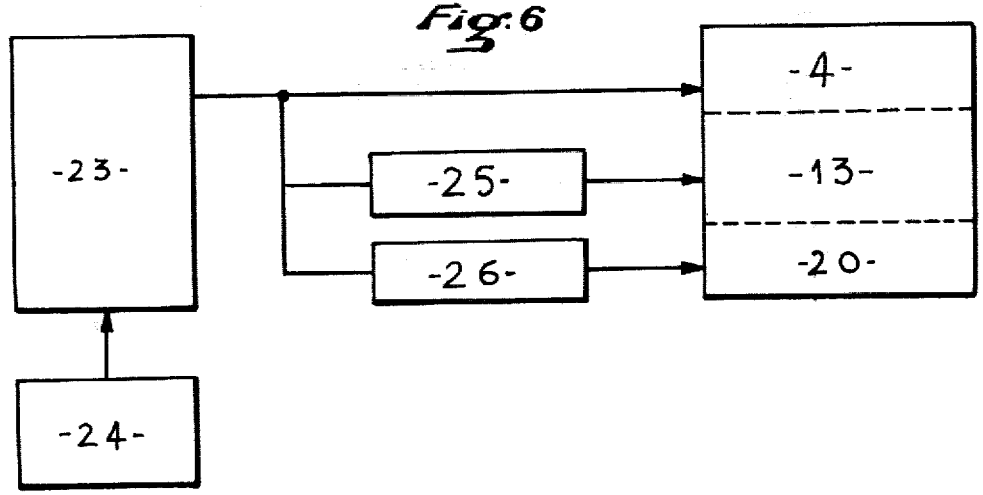
Fig: 6

PROCESS AND DEVICE FOR INSTALLING A VERTICAL GYROSCOPE

The present invention relates to a process for setting up a vertical gyroscope, and to a gyroscope applying this process.

More particularly, the invention relates to gyroscopes for missiles, target drones and unpiloted flying craft.

A vertical gyroscope or an artificial horizon of an aircraft is known to essentially comprise a spinner or symmetrical mass of revolution freely rotating about a pin or axis, an assembly for suspending said pin, with respect to the support of said gyroscope, means for rotating said spinner, and means for transducing the orientation of said axis, for example with respect to the vertical. Said suspension assembly gives said axis and therefore said spinner a total or virtually total freedom of angular position, whilst maintaining the centre of gravity of the whole fixed with respect to the support.

When it does not rotate, the spinner is therefore in astatic equilibrium and may occupy any angular position at the moment when it is spun in rotation. Its position should therefore be reset at this moment, i.e. its axis should be brought closer to that of the true vertical. The "set" or "reset" position of the spinner corresponds to the calibrated zeros of said transducer means.

This operation is delicate to carry out when the missile or aircraft supporting the gyroscope is placed or provisionally fixed on a mobile support and animated by random movements during the resetting of the spinner, for example when the gyroscope equips a missile shot from a ship or a helicopter.

This is why, particularly in the case of use described hereinabove, two elements are added to the gyroscopes:

a mechanism establishing a slight roll return moment of the mobile assembly in roll, when the spinner is stopped (action on the outer frame which is consequently considered as roll frame)

and an erector mechanism replacing said spinner automatically into vertical position as soon as said latter is driven by its driving means.

However, the presence of the roll return mechanism and of the erector mechanism does not overcome all the difficulties, as is explained hereinbelow.

To remedy these drawbacks, the process for setting up a gyroscopic device mounted on a moving craft and comprising a mass of revolution rotating about an axis of rotation having to serve as vertical reference, means for suspending said mass allowing said axis of rotation to be suspended with respect to the pitch axis and to the roll axis of said moving craft, drive means for driving said mass of revolution in rotation about its axis, means for resetting said axis of rotation in roll when said mass does not rotate, and a mechanical erector system with driven rotary pendulum, tending automatically to reset the axis of rotation of the mass on the vertical, is characterised in that the action of said roll reset means is eliminated only with a first delay with respect to the rotation of said mass, this first delay time being such that, upon its expiration, the kinetic moment of the mass in rotation is sufficient to ensure the stability thereof, and in that said erector system is controlled only with a second delay with respect to the rotation of said mass of revolution, this second delay time being greater than said first delay and being such that, on its expiration, the rotation of the pendulum and the kinetic moment are sufficient to reduce the movement of precession of the device about its roll axis.

Thus, in a gyroscopic device in which said drive means and said roll reset means are controlled electrically, the latter are controlled in parallel from a common source of supply and a delay device is disposed on the link between said source and said roll reset means, this delay being such that, on its expiration, the kinetic moment of the mass in rotation is sufficient to ensure the stability thereof.

The device further comprising mechanical erector system with driven rotary pendulum tending automatically to reset the axis of rotation of the mass on the vertical and the erector system being controlled electrically, the means for controlling said erector system are supplied by the common source of supply, in parallel on said drive means and said reset means, a delay device being disposed on the link between said source and said means controlling the erector system, this delay being such that, on its expiration, the rotation of the pendulum and the kinetic moment are sufficient to reduce the movement of precession of the device about its roll axis.

The invention will be more readily understood on reading the following description with reference to the accompanying drawings, in which:

FIG. 1 schematically illustrates the principle of known means for the return into roll of the equipment for suspending a rotary spinner of a gyroscopic device.

FIGS. 2 and 3 schematically illustrate the principle of known erector means for automatically bringing said spinner into vertical position as soon as it is driven by its drive means, FIGS. 2 and 3 respectively showing the axis of the spinner in vertical position and in position spaced from the vertical.

FIG. 4 shows, in diametrical section, an embodiment of erector means associated with a spinner and with its casing.

FIG. 5 is a plan view of the device of FIG. 4.

FIG. 6 is a block diagram of a control system for the gyroscopic device of the invention.

Referring now to the drawings, the gyroscopic device, of known type, comprises a spinner 1 contained in a casing 2 and adapted to be driven in rotation about its pin 3 of axis Z—Z' by an electric motor 4 housed in said casing (cf.FIG.4). The casing 2 comprises aligned journals 5 and 6 enabling it to pivot about the pitch axis Y—Y' of the vehicle (not shown) on which said gyroscopic device is mounted.

The journals 5 and 6 serve to articulate the casing 2 and its spinner 1 on a frame 7, itself pivoted about the roll axis X—X' of said vehicle. The frame 7 has not been shown in FIG. 4.

The supply and control connections of the motor 4 pass in known manner through the journals 5 and 6 of the axis Y—Y' and those (not shown) of axis X—X' of the frame 7.

The roll suspension frame 7 is fast with a cylindrical cam 8 on which rolls a roller 9 mounted to rotate freely on an arm 10 articulated on a pin 11 fast with the casing 2 of said gyroscopic device. The cam 8 is centred on the roll axis X—X'. A spring 12 fixed between the end of the arm 10 opposite the roller 9, and said casing, tends to apply the roller 9 against the operative surface of the cam 8 (position in dotted lines in FIG. 1) with a determined force. The shape of the cam 8 is such that, when said roller 9 abuts on its operative surface, the frame 7 is automatically reset and maintained at relative horizontal of the casing 2 (zero roll). An electromagnet 13 may eliminate the action of the roller 9 when it is activated, by attracting the arm 10 supporting the roller 9 against its armature 13a. The armature 13a and the winding 13b are rendered fast with the casing 2 by a casing 14.

When the electromagnet 13 is activated, the roll frame 7 is free and consequently the spinner 1 is also free in roll. When it is deactivated, the roller 9 is applied on the cam 8 and returns said frame 7 and said spinner 1 into horizontal position relative to the missile supporting the gyroscopic device, and maintains them there.

In the known technique, the electromagnet 13 is activated in synchronism with the spinning of the spinner by the motor 4.

Consequently, the return moment about the axis X—X' is eliminated at the same time as the rotation of the spinner 1 starts and a helical movement of said spinner very often appears at the beginning, this having the drawback of allowing a considerable deviation around the axis X—X', this deviation—in which sometimes exceeds 50°—being able to be corrected only by the work of the erector.

This helical movement on starting is provoked by the component, aroung the axis X—X', of the counter torque of the spinner motor 4, this component being larger as the angular displacement about axis Y—Y' is considerable at the moment when the motor 4 is switched on.

This results in the time for setting up a vertical gyroscopic device amounting to about ten minutes.

In accordance with the invention, by introducing a delay t1 (about 3 seconds for example) before releasing the frame 7 of the gyroscope and after having spun the spinner 1, the starting helical movement is eliminated due to the existence of the return moment about the axis X—X', which prevent the initiation of this helical movement, whilst the kinetic moment is still too little to ensure the stability of the gyroscope. The difference, i.e. the gain on the setting up time, is a very important parameter in the case of an anti-ship weapon system, for example, for which the reaction time of the system may constitute a decisive parameter. It may be said that the introduction of the delay t1 on the same gyroscope reduces the time of setting up from about ten minutes to about 2 minutes, this constituting an advantageous concrete result.

The advantage is even more noticeable in the case of using the gyroscope on a carrier vehicle in oscillation movement with considerable angular amplitudes during starting of the gyroscope (boat, airplane or helicopter for example), as, in this case, the resultant inclination on starting about the axis X—X' may bring the gyroscope into a configuration where its erection system may be made inefficient—or in any case only slightly efficient—this leading to a prohibitive setting up time, whilst, according to the invention, the gyroscope remains usable with an setting up time of a few minutes, even with a support presenting amplitudes of oscillation of 30° about the horizontal.

FIGS. 2 to 5 illustrate a known erector mechanism for gyroscopic device, the roll return device 8 to 14 not being shown in these Figures.

As shown in FIGS. 4 and 5, this erector mechanism for vertical gyroscopic device essentially comprises an unstable pendulum 15 articulated about the axis of rotation Z—Z', of the spinner 1, this unstable pendulum being driven in the same direction as the spinner 1 by a gear reducer 16 which is driven from the shaft 3 and which rotates, at constant speed of about 40 revs per minute when the spinner rotates for example at 23,000 r.p.m., a counterweight 17 of shape similar to the pendulum 15, articulated about the same axis, and especially of equivalent mass, so as to constitute therewith an assembly whose centre of gravity is located on the axis of rotation Z—Z' of the spinner, when the unstable pendulum 15 is aligned with the counterweight 17. This latter case is realised when the gyroscope is stabilised at the vertical and the erection system then applies no torque to the gyroscope. This is the case schematically illustrated in FIG. 2.

In its plane of rotation, perpendicular to the axis of rotation Z—Z' of the spinner 1, the unstable pendulum 15 has a freedom of angular movement between, on the one hand, a drive stop 18 which positions it in alignment with its counterweight 17 and, on the other hand, a front stop 19 which limits its free stroke in the direction of the movement of rotation of the gyroscopic system.

In this latter position of the pendulum (cf.FIG. 3), the erection system no longer being balanced, applies a torque to the gyroscopic device, this resulting in straightening the axis of rotation Z—Z' towards the vertical position V—V' if it had deviated therefrom.

In fact, it is seen in FIG. 3 that, in the case of inclination of the axis of rotation Z—Z' of the gyroscope, as soon as the high point of the line of greatest slope has been passed, the unstable pendulum 15 drops against its front stop 19 and remains there until the low point of the line of greatest slope of the plane of rotation has been passed. At this low point, it awaits the passage of its rear drive stop 18 which forces it to make the following half-revolution (rise m) at the constant speed of 40 r.p.m. imposed by the motor 4-reducer 16 assembly; after which, the phenomenon starts again upon each revolution of the erector, and, upon each revolution, the pendulum 15 therefore drops (descent d) more rapidly than it rises on the other side.

It is seen that the resultant torque applied to the gyroscope (by this difference between the durations of descent d and rise m of the pendulum) always has a straightening effect on average over one revolution, i.e. upon each revolution, it tends to reduce the deviation between the axis of rotation Z—Z' and the vertical V—V'.

To facilitate the representation of FIG. 3, it has been assumed that there is a considerable deviation about the internal axis Y—Y' only; of course, the erection system acts from a very small inclination, even less that 0.1° and on the other hand, the straightening effect remains valid for any orientation of the inclination with respect to the vertical and in particular in the case of a composed inclination about the two axes of suspension Y—Y' and X—X' at the same time.

In practice, functioning is as follows (cf.FIGS. 4 and 5): in the absence of current in a coil 20 fast with the box 2 and concentric with respect to axis Z—Z', a spring 21 maintains a pawl 22 in its low position for which it blocks the unstable pendulum 15 against its rear stop 18; the erection system then applies no torque on the gyroscope since the centre of gravity of the whole suspended assembly is at the meeting point of the two axes of suspension of which the internal axis is Y—Y'.

When the coil 20 is supplied at a sufficient voltage to provoke the attraction of the mobile plate connected to the pawl 22, the latter occupies the high position shown in FIG. 4 and the unstable pendulum 15 then regains its freedom of angular movement, this allowing the erector to operate. The energisation of the coil therefore enables the operation of the erector of the gyroscope to be controlled.

Of course, the supply connections of the coil 20 are guided outwardly of the suspension of the gyroscope by successively passing through the journals 5 and 6 of the inner axis Y—Y', then through the journals (not shown) of the axis of suspension X—X'.

With such a known mechanical erector, it is advantageous, according to the invention, for setting up the gyroscope, to control the erection only with a delay t2 on the operation of the motor 4 of the spinner 1, this delay t2 having to be enough to allow the erector to rotate at sufficient speed.

Without this delay t2, in fact, the unstable pendulum 15 (which rotates extremely slowly at the beginning of starting of the spinner 1) could be found, for an appreciable period of time, in a position where it would exert a fairly considerable torque on the gyroscope, which would have only a very low kinetic moment; in this case, the gyroscope could reach a very difficult—even impossible—position to be subsequently corrected by the erector, further to a rapid precession about the axis of suspension X—X'.

With the delay t2, on the contrary, the erector being neutralised, no unbalancing torque is exerted on the gyroscope during the corresponding time and therefore no undesirable precession results. For a spinner reaching its maximum speed of rotation after a period of 90 seconds, t2 may be chosen to be equal to 30 seconds.

FIG. 6 shows the block diagram of the control of the gyroscope according to the invention.

An electrical supply 23 is activated by a control 24. Said supply is connected in parallel:

to the motor 4 of the spinner 1 of the gyroscope, to the electromagnet 13 de-activing the roll reset moment of the suspension of said spinner via a relay 25 timed for example at 3 seconds, to the electromagnet 20 activating the erector, via a relay 26 timed for example at 30 seconds.

Thus, when the supply 23 is activated by the control 24, it delivers a current to the motor 4 of the spinner 1, then to the electromagnet 13 de-activating the roll reset moment with 3 seconds delay, then to the electro-magnet 20 for activating said erector with 30 seconds delay.

This results in a functioning which enables the time for setting up the gyroscope to be largely reduced (2 minutes instead of 10 minutes), this result usually being obtained with very sophisticated equipment whose price may amount to twenty times that of equipment including the device according to the invention.

The device according to the invention may be easily mounted on any gyroscope not provided to receive it, and in particular on simple gyroscopes on the market originally having an setting up time which is prohibitive for use on missiles.

What is claimed is:

1. A gyroscopic device adapted to be mounted on a moving craft comprising:
    a mass of revolution rotatable about an axis of rotation serving as a vertical reference;
    means for suspending said mass allowing said axis of rotation to be suspended with respect to the pitch axis and the roll axis of said moving craft;
    drive means for driving said mass in rotation about its axis;
    roll reset means for resetting said axis of rotation into roll when said mass does not rotate;
    a mechanical errector system having a driven rotary pendulum, tending automatically to reset said axis of rotation of said mass on the vertical;
    said drive means, said return means, and said erector system being controlled electrically in parallel from a common source of supply;
    first time delay means disposed between said source and said roll reset means for producing a first delay such that, on its expiration, the kinetic moment of said mass in rotation is sufficient to insure the stability thereof; and
    second time delay means disposed between said source and said erector system for producing a second delay such that, on its expiration, the speed of rotation of said pendulum is sufficient to avoid any movement of precession of the device about its roll axis.

2. The device of claim 1 wherein said second delay is greater than said first delay.

* * * * *